US011368718B2

(12) United States Patent
Xia

(10) Patent No.: US 11,368,718 B2
(45) Date of Patent: Jun. 21, 2022

(54) DATA PROCESSING METHOD AND NON-TRANSITORY COMPUTER STORAGE MEDIUM

(71) Applicant: GUANGDONG OPPO MOBILE TELECOMMUNICATIONS CORP., LTD., Guangdong (CN)

(72) Inventor: Yang Xia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/207,111

(22) Filed: Mar. 19, 2021

(65) Prior Publication Data

US 2021/0211725 A1 Jul. 8, 2021

Related U.S. Application Data

(63) Continuation of application No. PCT/CN2019/100639, filed on Aug. 14, 2019.

(30) Foreign Application Priority Data

Sep. 30, 2018 (CN) .......................... 201811163427.8

(51) Int. Cl.
H04N 19/597 (2014.01)
(52) U.S. Cl.
CPC .................. *H04N 19/597* (2014.11)
(58) Field of Classification Search
None
See application file for complete search history.

(56) References Cited

U.S. PATENT DOCUMENTS

2016/0150237 A1   5/2016   Kim et al.
2017/0102993 A1   4/2017   Hu et al.
(Continued)

FOREIGN PATENT DOCUMENTS

CN   101742349 A   6/2010
CN   101873489 A   10/2010
(Continued)

OTHER PUBLICATIONS

Chinese First office action with English Translation of Chinese application No. 201811163427.8,dated Jul. 31, 2019 (21 pages).
Chinese second office action with English Translation of Chinese application No. 201811163427.8,dated Dec. 25, 2019 (18 pages).
Chinese third office action with English Translation of Chinese application No. 201811163427.8,dated Jun. 2, 2020 (22 pages).
(Continued)

Primary Examiner — Christopher Braniff
(74) Attorney, Agent, or Firm — Young Basile Hanlon & MacFarlane, P.C.

(57) ABSTRACT

A data processing method and a non-transitory computer storage medium are disclosed. The data processing method is applied in a terminal and includes: dynamically determining a current coding-mapping relationship of pixel coding; sending the current coding-mapping relationship or indication information of the current coding-mapping relationship to a mobile edge computing MEC server; performing pixel coding on pixel values of three-dimensional video data based on the current coding-mapping relationship and obtaining pixel-coded data; and sending the pixel-coded data to the mobile edge computing MEC server. The pixel-coded data are configured to restore the three-dimensional video data by the MEC server. A data volume of the three-dimensional video data before pixel coding may be a first data volume. A data volume of the three-dimensional video data after pixel coding may be a second data volume. The first data volume may be greater than the second data volume.

17 Claims, 3 Drawing Sheets

(56) References Cited

U.S. PATENT DOCUMENTS

| | | | |
|---|---|---|---|
| 2018/0268516 A1* | 9/2018 | Coban | H04N 19/85 |
| 2020/0099742 A1* | 3/2020 | Puente Pestana | H04L 67/1076 |

FOREIGN PATENT DOCUMENTS

| | | | |
|---|---|---|---|
| CN | 102170579 A | 8/2011 |
| CN | 102387359 A | 3/2012 |
| CN | 101472190 B | 1/2013 |
| CN | 105611274 A | 5/2016 |
| CN | 106961612 A | 7/2017 |
| CN | 108111833 A | 6/2018 |
| CN | 108123777 A | 6/2018 |
| CN | 108235007 A | 6/2018 |
| CN | 108495112 A | 9/2018 |
| CN | 109151436 A | 1/2019 |
| CN | 109257609 A | 1/2019 |
| CN | 109274976 A | 1/2019 |

OTHER PUBLICATIONS

Notification to Grant Patent Right for Invention with English Translation of Chinese application No. 201811163427.8, dated Nov. 4, 2020 (6 pages).

International search report with English Translation of Chinese application No. PCT/CN2019/100639, dated Oct. 24, 2019 (16 pages).

Michael Schneider et al., Augmented Reality based on Edge Computing using the example of Remote Live Support, XP_33091243A, 1277-1282.

Extended European Search Report for EP Application 19866939.2 dated Jul. 16, 2021. (10 pages).

Pete Santago et al., New Technique For Combined Pixel And Frequency Domain Image Sequence Coding, XP_31433347A, 624-627.

* cited by examiner

DATA PROCESSING METHOD AND NON-TRANSITORY COMPUTER STORAGE MEDIUM

CROSS-REFERENCE TO RELATED APPLICATION(S)

The present application is a continuation-application of International (PCT) Patent Application No. PCT/CN2019/100639 filed on Aug. 14, 2019, which claims foreign priority of Chinese Patent Application No. 201811163427.8 filed on Sep. 30, 2018, the contents of both of which are hereby incorporated by reference in their entireties.

TECHNICAL FIELD

The present disclosure relates to but is not limited to the field of information technology, and in particular to a data processing method and a non-transitory computer storage medium.

BACKGROUND

In an image, a pixel value may generally be used to represent various information such as color, gray scale, brightness etc. of a certain pixel one by one. Generally, with a same amount of information transmitted, a bandwidth taken by images and/or videos is relatively large. Thus, in some image transmission scenarios, if images are continuously transmitted, a large amount of bandwidths may be taken, or transmission delay may be great.

SUMMARY

The present disclosure provides a data processing method and a non-transitory computer storage medium.

In some aspects, a data processing method applied to a terminal may be provided. The method may include: dynamically determining a current coding-mapping relationship of pixel coding; sending the current coding-mapping relationship or indication information of the current coding-mapping relationship to a mobile edge computing MEC server; performing pixel coding on pixel values of three-dimensional vide o data based on the current coding-mapping relationship and obtaining pixel-coded data; and sending the pixel-coded data to the mobile edge computing MEC server, wherein the pixel-coded data are configured to restore the three-dimensional video data by the MEC server. A data volume of the three-dimensional video data before pixel coding may be a first data volume. A data volume of the three-dimensional video data after pixel coding may be a second data volume. The first data volume may be greater than the second data volume.

In some aspects, a data processing method applied to a mobile edge computing MEC server may be provided. The method may include: receiving a current coding-mapping relationship or indication information of the current coding-mapping relationship sent by a terminal; receiving pixel-coded data sent by the terminal; and obtaining pixel values of the three-dimensional video data by restoring the pixel-coded data according to the current coding-mapping relationship. A data volume of the three-dimensional video data before pixel coding may be a first data volume. A data volume of the three-dimensional video data after pixel coding may be a second data volume. The first data volume may be greater than the second data volume.

In some aspects, a non-transitory computer storage medium may be disclosed. The computer storage medium stores at least one computer instruction. When being executed by a processor, the at least one instruction is configured to implement operations of a data processing method applied to the terminal. The method comprises: dynamically determining a current coding-mapping relationship of pixel coding; sending the current coding-mapping relationship or indication information of the current coding-mapping relationship to a mobile edge computing MEC server; performing pixel coding on pixel values of three-dimensional video data based on the current coding-mapping relationship and obtaining pixel-coded data; and sending the pixel-coded data to the mobile edge computing MEC server, wherein the pixel-coded data are configured to restore the three-dimensional video data by the MEC server. A data volume of the three-dimensional video data before pixel coding is a first data volume, a data volume of the three-dimensional video data after pixel coding is a second data volume, and the first data volume is greater than the second data volume.

DETAILED DESCRIPTION

Figure 1:
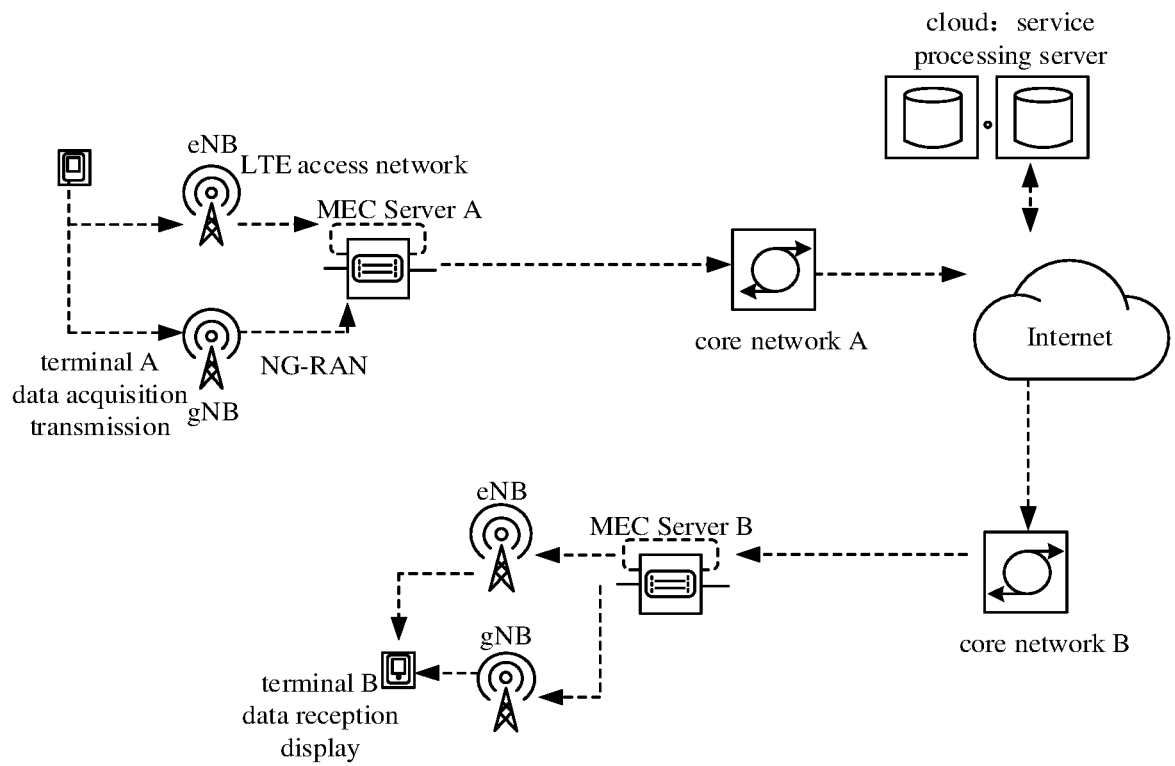
FIG. 1 is a schematic diagram of a system architecture for applying a data transmission method according to an embodiment of the present disclosure.

In some aspects, a data processing method applied to a terminal may include: dynamically determining a current coding-mapping relationship of pixel coding; sending the current coding-mapping relationship or indication information of the current coding-mapping relationship to a mobile edge computing MEC server; performing pixel coding on pixel values of three-dimensional video data based on the current coding-mapping relationship and obtaining pixel-coded data; and sending the pixel-coded data to the mobile edge computing MEC server, wherein the pixel-coded data are configured to restore the three-dimensional video data by the MEC server. A data volume of the three-dimensional video data before pixel coding may be a first data volume. A data volume of the three-dimensional video data after pixel coding may be a second data volume. The first data volume may be greater than the second data volume.

In some embodiments, the dynamically determining a current coding-mapping relationship of pixel coding may include at least one of: selecting the current coding-mapping relationship from candidate coding-mapping relationships in response to a target scenario corresponding to the three-dimensional video data; and selecting the current coding-mapping relationship from the candidate coding-mapping relationships in response to a precision requirement of the three-dimensional video data.

In some embodiments, the selecting the current coding-mapping relationship from candidate coding-mapping relationships in response to a target scenario corresponding to the three-dimensional video data may include at least one of: selecting a first coding-mapping relationship in a single coding-mapping mode as the current coding-mapping relationship in response to the three-dimensional video data corresponding to a moving scenario in which an acquisition object moves; selecting a second coding-mapping relationship in a combined coding-mapping mode as the current coding-mapping relationship in response to the three-dimensional video data corresponding to a static scenario in which the acquisition object is static; selecting the first coding-mapping relationship in the single coding-mapping mode as the current coding-mapping relationship in response to a switching rate of an acquisition scenario corresponding to the three-dimensional video data being greater than a first preset rate; and selecting the second coding-mapping relationship in the combined coding-mapping mode as the current coding-mapping relationship in response to the switching rate of the acquisition scenario corresponding to the three-dimensional video data being less than the first preset rate.

In some embodiments, the selecting the current coding-mapping relationship from the candidate coding-mapping relationships in response to a precision requirement of the three-dimensional video data may include at least one of: selecting a first coding-mapping relationship in a single coding-mapping mode from the candidate coding-mapping relationships in response to the precision requirement of the three-dimensional video data being no less than a first precision threshold; selecting a second coding-mapping relationship in a combined coding-mapping mode from the candidate coding-mapping relationships in response to the precision requirement of the three-dimensional video data being less than the first precision threshold; selecting a first combined coding-mapping relationship in the combined coding-mapping mode in which N1*M1 pixels are combined into a set from the candidate coding-mapping relationships in response to the precision requirement of the three-dimensional video data being less than the second precision threshold; and selecting a second combined coding-mapping relationship in the combined coding-mapping mode in which N2*M2 pixels are combined into a set from the candidate coding-mapping relationships in response to the precision requirement of the three-dimensional video data being no less than the second precision threshold and less than the first precision threshold. N2*M2 may be less than N1*M1. The first precision threshold may be less than the second precision threshold.

In some embodiments, the dynamically determining a current coding-mapping relationship of pixel coding may include: generating the current coding-mapping relationship in response to the precision requirement and/or the target scenario of the three-dimensional video data.

In some embodiments, the generating the current coding-mapping relationship in response to the precision requirement and/or the target scenario of the three-dimensional video data may include: determining the current coding-mapping mode according to the precision requirement and/or the target scenario; obtaining serial numbers of pixel values of the three-dimensional video data according to a sorting of the pixel values of a sample three-dimensional video data sorted in a preset sorting order, in response to the current coding-mapping mode being a single coding-mapping mode; and establishing a mapping relationship between the pixel values and the serial numbers of the pixel values.

In some embodiments, the serial numbers of the pixel values comprise at least one of: serial numbers of color values formed by sorting the color values; and serial numbers of depth values formed by sorting the depth values.

In some embodiments, the generating the current coding-mapping relationship in response to the precision requirement and/or the target scenario of the three-dimensional video data may include: determining a value of N*M in a combined coding-mapping mode according to the precision requirement and/or the target scenario, in response to the current coding-mapping mode being the combined coding-mapping mode; wherein values of N and M are positive integers; sorting pixel sets each comprising pixel values of N*M pixels according to the pixel values of the sample three-dimensional video data and obtaining serial numbers of the pixel sets of the sample three-dimensional video data; and establishing a mapping relationship between the pixel values and the serial numbers of the pixel sets.

In some embodiments, the serial numbers of the pixel sets comprise at least one of: serial numbers of color value sets formed by sorting the color value sets; and serial numbers of depth value sets formed by sorting the depth value sets.

In some embodiments, the method further may include: updating the current coding-mapping relationship according to a sample three-dimensional video data, in response to the sample three-dimensional video data comprising pixel values being out of the current coding-mapping relationship; and sending the updated current coding-mapping relationship or an updated part of the current coding-mapping relationship to the MEC server.

In some embodiments, the performing pixel coding on pixel values of three-dimensional video data based on the current coding-mapping relationship and obtaining pixel-coded data may include at least one of: performing single pixel coding on the pixel values of pixels of the three-dimensional video data according to a first coding-mapping relationship in a single coding-mapping mode and obtaining coded data of a first class, wherein the number of bits occupied by the coded data of the first class is less than the number of bits occupied by the pixel values; and performing combined pixel coding on pixel values of N*M pixels of the three-dimensional video data according to a second coding-mapping relationship in a combined coding-mapping mode and obtaining coded data of a second class, wherein values of N and M are both positive integers.

In some aspects, a data processing method applied to a mobile edge computing MEC server may include: receiving a current coding-mapping relationship or indication information of the current coding-mapping relationship sent by a terminal; receiving pixel-coded data sent by the terminal; and obtaining pixel values of three-dimensional video data by restoring the pixel-coded data according to the current coding-mapping relationship. A data volume of the three-dimensional video data before pixel coding may be a first data volume. A data volume of the three-dimensional video data after pixel coding may be a second data volume. The first data volume may be greater than the second data volume.

In some embodiments, the obtaining pixel values of the three-dimensional video data by restoring the pixel-coded data according to the current coding-mapping relationship may include at least one of: restoring color values of the three-dimensional video data according to color coded data of the pixel-coded data and the current coding-mapping relationship; and restoring depth values of the pixel values of the three-dimensional video data according to depth-value coded data of the pixel-coded data and the current coding-mapping relationship.

In some embodiments, the obtaining pixel values of the three-dimensional video data by restoring the pixel-coded data according to the current coding-mapping relationship may include at least one of: restoring the pixel values of the three-dimensional video data by decoding the pixel-coded data of pixels by utilizing the current coding-mapping relationship and according to a single coding-mapping mode; and restoring the pixel values of the three-dimensional video data by decoding the pixel-coded data of N*M pixels by utilizing the current coding-mapping relationship and according to a combined coding-mapping mode.

In some aspects, a data processing apparatus applied to a terminal may include a determining module, a first sending module, an obtaining module and a second sending module.

The determining module may be configured to dynamically determine a current coding-mapping relationship of pixel coding. The first sending module may be configured to send the current coding-mapping relationship or indication information of the current coding-mapping relationship to a mobile edge computing MEC server. The obtaining module may be configured to obtain pixel-coded data by performing pixel coding on pixel values of three-dimensional video data based on the current coding-mapping relationship. The second sending module may be configured to send the pixel-coded data to the mobile edge computing MEC server, wherein the pixel-coded data are configured to restore the three-dimensional video data by the MEC server. A data volume of the three-dimensional video data before pixel coding may be a first data volume. A data volume of the three-dimensional video data after pixel-coding may be a second data volume. The first data volume may be greater than the second data volume.

In some embodiments, the determining module may include a first selecting sub-module and a second selecting sub-module. The first selecting sub-module may be configured to select the current coding relationship from candidate coding-mapping relationships in response to a target scenario corresponding to the three-dimensional video data. The second selecting sub-module may be configured to select the current coding relationship from the candidate coding-mapping relationships in response to a precision requirement of the three-dimensional video data.

In some embodiments, the first selecting sub-module may be configured to perform at least one of: selecting a coding-mapping relationship in a single coding-mapping mode as the current coding relationship in response to the three-dimensional video data corresponding to a moving scenario in which an acquisition object moves; selecting the coding-mapping relationship in a combined coding-mapping mode as the current coding-mapping relationship in response to the three-dimensional video data corresponding to a static scenario in which the acquisition object is static; selecting the coding-mapping relationship in the single coding-mapping mode as the current coding relationship in response to a switching rate of an acquisition scenario corresponding to the three-dimensional video data being greater than a first preset rate; and selecting the coding-mapping relationship in the combined coding-mapping mode as the current coding relationship in response to the switching rate of the acquisition scenario corresponding to the three-dimensional video data being less than the first preset rate.

In some embodiments, the second selecting sub-module may be configured to perform at least one of: selecting a coding-mapping relationship in a single coding-mapping mode from the candidate coding relationships in response to the precision requirement of the three-dimensional video data being no less than a first precision threshold; selecting a coding-mapping relationship in a combined coding-mapping mode from the candidate relationships in response to the precision requirement of the three-dimensional video data being less than a first precision threshold; selecting a coding-mapping relationship in the combined mapping mode in which N1*M1 pixels are combined into a set from candidate relationships in response to the precision requirement of the three-dimensional video data being less than the second precision threshold; and selecting a coding-mapping relationship in the combined mapping mode in which N2*M2 pixels are considered as a set from candidate relationships in response to the precision requirement of the three-dimensional video data being no less than the second precision threshold; wherein N2*M2 is greater than N1*M1.

In some embodiments, the determining module may include a generating sub-module. The generating sub-module may be configured to generate the current coding-mapping relationship in response to the precision requirement and/or the target scenario of the three-dimensional video data.

In some embodiments, the generating sub-module may be configured to: determine the current coding-mapping mode according to the precision requirement and/or the target scenario; obtain serial numbers of pixel values of the three-dimensional video data according to a sorting of the pixel values of a sample three-dimensional video data sorted in a preset sorting order, in response to the current coding-mapping mode being a single coding-mapping mode; and establish a mapping relationship between the pixel values and the serial numbers of the pixel values.

In some embodiments, the serial numbers of the pixel values may include at least one of: serial numbers of color values formed by sorting the color values; and serial numbers of depth values formed by sorting the depth values.

In some embodiments, the generating sub-module may be configured to: determine a value of N*M in a combined coding-mapping mode according to the precision requirement and/or the target scenario, in response to the current coding-mapping mode being the combined coding-mapping mode; wherein values of N and M are positive integers; sort pixel sets each comprising pixel values of N*M pixels according to the pixel values of the sample three-dimensional video data and obtain serial numbers of the pixel sets of the sample three-dimensional video data; and establish a mapping relationship between the pixel values and the serial numbers of the pixel sets.

In some embodiments, the serial numbers of the pixel sets comprise at least one of: serial numbers of color value sets formed by sorting the color value sets; and serial numbers of depth value sets formed by sorting the depth value sets.

In some embodiments, the apparatus further may include: an updating module, configured to update the current coding-mapping relationship according to a sample three-dimensional video data, in response to the sample three-dimensional video data comprising pixel values being out of the current coding-mapping relationship; and a third sending module, configured to send the updated current coding-mapping relationship or an updated part of the current coding-mapping relationship to the MEC server.

In some embodiments, the obtaining module may be configured to perform at least one of: obtaining coded data of a first class by performing single pixel coding on the pixel values of pixels of the three-dimensional video data according to a coding-mapping relationship in a single pixel coding mode, wherein the number of bits occupied by the coded data of the first class is less than the number of bits occupied by the pixel values; and obtaining a pixel code of a second class by performing combined pixel coding on pixel values of N*M pixels of the three-dimensional video data according to a coding-mapping relationship of a combined pixel coding mode, wherein values of N and M are both positive integers.

In some aspects, a data processing apparatus applied to a mobile edge computing MEC server may include a first receiving module, a second receiving module and a restoring module. The first receiving module may be configured to receive a current coding-mapping relationship or indication information of the current coding-mapping relationship sent by a terminal. The second receiving module may be configured to receive pixel-coded data sent by the terminal. The restoring module may be configured to obtain pixel values of the three-dimensional video data by restoring the pixel-coded data according to the current coding-mapping relationship. A data volume of the three-dimensional video data before pixel coding may be a first data volume. A data volume of the three-dimensional video data after pixel coding may be a second data volume. The first data volume may be greater than the second data volume.

In some embodiments, the restoring module may be specifically configured to perform at least one of: restore color pixel values of the three-dimensional video data according to color coded data of the pixel-coded data and the current coding-mapping relationship; and restore depth values of the pixel values of the three-dimensional video data according to depth-value coded data of the pixel-coded data and the current coding-mapping relationship.

In some embodiments, the restoring module may be specifically configured to perform at least one of: restoring the pixel values of the three-dimensional video data by decoding the pixel-coded data of pixels by utilizing the current coding-mapping relationship and according to a single pixel coding mode; and restoring the pixel values of the three-dimensional video data by decoding the pixel-coded data of N*M pixels by utilizing the current coding-mapping relationship and according to a combined pixel coding mode.

In some aspects, a non-transitory computer storage medium may be provided. The computer storage medium stores at least one computer instruction. The at least one instruction may be configured to implement operations of a data processing method applied to a terminal. The data processing method may include: dynamically determining a current coding-mapping relationship of pixel coding; sending the current coding-mapping relationship or indication information of the current coding-mapping relationship to a mobile edge computing MEC server; performing pixel coding on pixel values of three-dimensional video data based on the current coding-mapping relationship and obtaining pixel-coded data; and sending the pixel-coded data to the mobile edge computing MEC server, wherein the pixel-coded data are configured to restore the three-dimensional video data by the MEC server.

A data volume of the three-dimensional video data before pixel coding may be a first data volume. A data volume of the three-dimensional video data after pixel coding may be a second data volume. The first data volume may be greater than the second data volume.

In some embodiments, the dynamically determining a current coding-mapping relationship of pixel coding may include at least one of: selecting the current coding-mapping relationship from candidate coding-mapping relationships in response to a target scenario corresponding to the three-dimensional video data; and selecting the current coding-mapping relationship from the candidate coding-mapping relationships in response to a precision requirement of the three-dimensional video data.

In some embodiments, the selecting the current coding-mapping relationship from candidate coding-mapping relationships in response to a target scenario corresponding to the three-dimensional video data may include at least one of: selecting a first coding-mapping relationship in a single coding-mapping mode as the current coding-mapping relationship in response to the three-dimensional video data corresponding to a moving scenario in which an acquisition object moves; selecting a second coding-mapping relationship in a combined coding-mapping mode as the current coding-mapping relationship in response to the three-dimensional video data corresponding to a static scenario in which the acquisition object is static; selecting the first coding-mapping relationship in the single coding-mapping mode as the current coding-mapping relationship in response to a switching rate of an acquisition scenario corresponding to the three-dimensional video data being greater than a first preset rate; and selecting the second coding-mapping relationship in the combined coding-mapping mode as the current coding-mapping relationship in response to the switching rate of the acquisition scenario corresponding to the three-dimensional video data being less than the first preset rate.

In some embodiments, the selecting the current coding-mapping relationship from the candidate coding-mapping relationships in response to a precision requirement of the three-dimensional video data may include at least one of: selecting a first coding-mapping relationship in a single coding-mapping mode from the candidate coding-mapping relationships in response to the precision requirement of the three-dimensional video data being no less than a first precision threshold; selecting a second coding-mapping relationship in a combined coding-mapping mode from the candidate coding-mapping relationships in response to the precision requirement of the three-dimensional video data being less than the first precision threshold; selecting a first combined coding-mapping relationship in the combined coding-mapping mode in which N1*M1 pixels are combined into a set from the candidate coding-mapping relationships in response to the precision requirement of the three-dimensional video data being less than the second precision threshold; and selecting a second combined coding-mapping relationship in the combined coding-mapping mode in which N2*M2 pixels are combined into a set from the candidate coding-mapping relationships in response to the precision requirement of the three-dimensional video data being no less than the second precision threshold and less than the first precision threshold. N2*M2 may be less than N1*M1 and the first precision threshold may be less than the second precision threshold.

In some embodiments, the dynamically determining a current coding-mapping relationship of pixel coding may include: generating the current coding-mapping relationship in response to the precision requirement and/or the target scenario of the three-dimensional video data; and the generating the current coding-mapping relationship in response to the precision requirement and/or the target scenario of the three-dimensional video data may include: determining the current coding-mapping mode according to the precision requirement and/or the target scenario; obtaining serial numbers of pixel values of the three-dimensional video data according to a sorting of the pixel values of a sample three-dimensional video data sorted in a preset sorting order, in response to the current coding-mapping mode being a single coding-mapping mode; and establishing a mapping relationship between the pixel values and the serial numbers of the pixel values.

In some embodiments, the performing pixel coding on pixel values of three-dimensional video data based on the current coding-mapping relationship and obtaining pixel-coded data may include at least one of: performing single pixel coding on the pixel values of pixels of the three-dimensional video data according to a first coding-mapping relationship in a single coding-mapping mode and obtaining coded data of a first class, wherein the number of bits occupied by the coded data of the first class is less than the number of bits occupied by the pixel values; and performing combined pixel coding on pixel values of N*M pixels of the three-dimensional video data according to a second coding-mapping relationship in a combined coding-mapping mode and obtaining coded data of a second class, wherein values of N and M are both positive integers.

In some aspects, an electronic device may include a memory, a processor and a computer instruction. The computer instruction may be configured to be stored on the memory and executed by the processor. The processor may be configured to execute the instruction to implement operations of the data processing method mentioned above, or to implement operations of the data processing method mentioned above.

Before detailing technical solutions of embodiments of the present disclosure, a system architecture for applying a data processing method of embodiments of the present disclosure is briefly illustrated first. The data processing method of embodiments of the present disclosure may be applied to a service relating to three-dimensional (3D) video data. The service may be a service for distributing 3D video data, or a live broadcast service based on 3D video data. In this case, due to a large data volume of the 3D video data, during a data transmission process, a higher technical support may be required for the depth data and 2D (two dimensional) video data transmitted independently. Therefore, a mobile communication network may need a faster data transmission rate and a relatively stable data transmission environment.

FIG. 1 is a schematic diagram of a system architecture for applying a data transmission method according to an embodiment of the present disclosure. As shown in FIG. 1, the system may include a terminal, a base station, an MEC (Mobile Edge Computing) server, a service processing MEC server, a core network, and an Internet, etc. A high-speed channel may be established between the MEC server and the service processing MEC server through the core network to achieve a data synchronization.

Taking the application scenario shown in FIG. 1 of interaction between two terminals as an example. The MEC server A may be an MEC server deployed near or close to or adjacent to a terminal A (a sending end). The core network A may be a core network of an area in which the terminal A is located. Correspondingly, The MEC server B may be an MEC server deployed near or close to or adjacent to a terminal B (a receiving end). The core network B may be a core network of an area in which the terminal B is located. A high-speed channel may be established between the MEC server A and the service processing MEC server through the core network A to achieve the data synchronization. A high-speed channel may be established between the MEC server B and the service processing MEC server through the core network B to achieve the data synchronization.

After the 3D video data sent by the terminal A are transmitted to the MEC server A, the data may be synchronized to the service processing MEC server through the core network A by the MEC server A. The MEC server B may then fetch or acquire or obtain the 3D video data sent by the terminal A from the service processing MEC server, and send the 3D video data to the terminal B for display.

Here, if the terminal B and the terminal A implement transmission through a same MEC server, then the terminal B and the terminal A simply implement the transmission of the 3D video data through a same MEC server without the participation of the service processing MEC server. This approach may be referred to as the Local return approach or Local backhaul approach. Specifically, if the terminal B and the terminal A implement the transmission of the 3D video data through the MEC server A, the 3D video data sent by the terminal A may be transmitted to the MEC server A, and then be further sent to the terminal B by the MEC server A for display.

Here, the terminal may select an evolved base station (eNB) connected or accessed to the 4G network or a next-generation evolved base station (gNB) connected or accessed to a 5G network depending on network conditions, the terminal's own configuration or an algorithm of the terminal's own configuration. In this way, the eNB may be connected or accessed to the MEC server through a long-term evolution (LTE) radio access network, or the gNB may be connected or accessed to the MEC server through a next generation radio access network (NG-RAN).

Here, the MEC server may be deployed on a network edge side near the terminal or a data source. The so-called "near the terminal or near the data source" may mean being near the terminal or near the data source in terms of logical locations and geographical locations. In an existing mobile communication network, major service processing MEC servers are deployed in several large cities. While in some embodiments of the present disclosure, multiple MEC servers may be deployed in a same city. For example, an MEC server may be deployed near an office building with a lot of users accommodated therein.

The MEC server may be an edge computing gateway with core capabilities converging network, computing, storage and application. The MEC server may be used as a platform supporting the edge computing in the domains of devices, network, data and application. The MEC server may connect to various kinds of smart devices and sensors, provide smart couples and data processing services nearby, process different kinds of application and data in the MEC server, thereby realizing key intelligent services such as real-time business, smart business, data aggregation and interoperation, security and privacy protection, and effectively improving intelligent decision efficiency of services.

Figure 2:
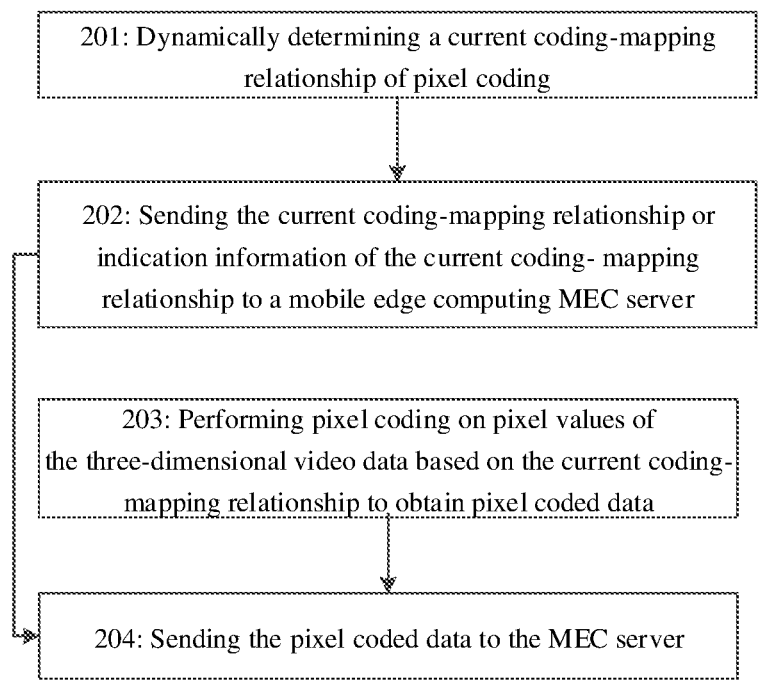
FIG. 2 is a schematic flowchart of a data processing method according to an embodiment of the present disclosure.

A data processing method applied in the terminal according to some embodiments of the present disclosure may include operations at blocks illustrated in FIG. 2.

At block 201, a current coding-mapping relationship of pixel-coding may be dynamically determined.

At block 202, the current coding-mapping relationship or indication information of the current coding-mapping relationship may be sent to a mobile edge computing MEC server.

At block 203, pixel values of 3D video data may be pixel coded according to or based on or in response to the current coding-mapping relationship, and pixel-coded data may be obtained.

At block 204, the pixel-coded data may be sent to the mobile edge computing MEC server. The pixel-coded data may be used by the MEC server to restore the 3D video data.

A data volume of the 3D video data before being pixel coded may be a first data volume. A data volume of the 3D video data after being pixel coded may be a second data volume. The first data volume may be greater than the second data volume.

The data processing method provided in embodiments of the present disclosure may be applied to a terminal. The terminal may be of various kinds, such as a cell phone, a tablet computer, a wearable device, a stationary image monitor, or the like. The terminal may be a stationary terminal and/or a mobile terminal.

At block 201, before the transmission of the 3D video data is conducted, the current coding-mapping relationship may be required to be determined. For example, the 3D video data may be transmitted based on a transmission control protocol (TCP) or a user datagram protocol (UDP). If the 3D video data are transmitted based on the TCP protocol, then the current coding-mapping relationship or the indication information of the current coding-mapping relationship may be sent to the MEC server during a handshake phase of establishing the TCP connection, or may be sent to the MEC server through the TCP connection after the TCP connection has been formally established.

If the pixel-coded data are transmitted based on the UDP protocol, then the current coding-mapping relationship or the indication information of the current coding-mapping relationship may be sent with a special UDP data packet.

The indication information of the current coding-mapping relationship may be information for the MEC server to uniquely determine the current coding-mapping relationship, such as numbering information or name information of the current coding-mapping relationship.

In some embodiments, the current coding-mapping relationship may be dynamically determined, and thus the current coding-mapping relationship may be determined depending on current needs. Compared with using a static coding-mapping relationship, using a dynamic coding-mapping relationship could satisfy the transmission requirement and the data transmission quality of the 3D video data in different application scenarios.

In some embodiments, the 3D video data may include a two-dimensional image and a depth image. The two-dimensional image may include color pixels. The pixel value of a color pixel may be a color value. For example, the color value may be a red/green/blue (RGB) value or a luminance/chrominance/saturation (YUV) value.

The depth image may include depth pixels. The pixel value of a depth pixel may be a depth value. The depth value may represent a spatial distance between an image acquisition object and an image acquisition module. The 3D video data and the depth image may construct a three-dimensional image in a three-dimensional image space.

In some embodiments, an image size of the two-dimensional image and an image size of the depth image may be substantially identical or equal to each other. For example, the two-dimensional image and the depth image may both include W*H pixels. W represents the number of pixels included along a first direction. H represents the number of pixels included along a second direction. W and H may both be positive integers.

In some embodiments, the two-dimensional image and the depth image may be two images acquired at the same time point. In order to reduce the data volume, the image size of the two-dimensional image and the image size of the depth image may satisfy a preset relationship. For example, the number of pixels included in the two-dimensional image may be W*H, while the number of pixels included in the corresponding depth image may be (W/a) *(H/b). In this way, one depth pixel may correspond to a*b color pixels. When a 3D video is constructed, the pixel value of one depth pixel may be applied to the pixel values of a*b adjacent color pixels. For example, (W/a)*(H/b) may be equal to (W/2)*(H/2). In this way, one depth pixel may correspond to 4 color pixels. When constructing a 3D video, the pixel value of one depth pixel may be applied to the pixel values of 4 adjacent color pixels. In this way, the image data volume of the depth image may be reduced. The unevenness in adjacent tiny areas of an object may generally be the same. Thus, if the image size of the depth image is less than the image size of the two-dimensional image, the restoration and construction of the 3D video may be maintained at a relatively high precision. At the same time, the data volume that needs to be interacted between the terminal and the MEC server and/or the data volume that needs to be processed by the MEC server may be reduced.

In some embodiments, when the image size of the depth image generated is less than that of the two-dimensional image, the depth image may be generated in at least one of the following manners: the depth image may be acquired directly based on the image size of the depth image; an original depth image may be acquired based on the image size of the two-dimensional image, and then the depth image may be generated based on pixel values of adjacent a*b pixels according to the image size of the depth image. For example, the depth image may be generated based on an average value or median value of adjacent a*b pixel values.

In some embodiments, a first coding may be the coding through which sensor data are converted into pixel values. In some embodiments, a second coding may be performed on the pixel values. The second coding here may be the pixel coding. After the pixel coding is completed, the pixel-coded data may be obtained.

In some embodiments, after the pixel values are pixel coded, the generated pixel-coded data may include the pixel value codes, not the pixel values themselves. In this way, after receiving the pixel-coded data, the receiving end cannot display or read the image directly based on the pixel-coded data. The pixel-coded data may need to be restored to the pixel value itself before the image could be normal displayed or read.

In some embodiments, the first coding may be a kind of coding built in many image acquisition modules. In this way, the image acquisition module may capture the light, and directly storage pixel values that has experienced a sensor data conversion in a memory. That is, the pixel values have experienced the first coding.

The pixel-coded data obtained after the pixel-coding is completed may be transmitted to the MEC server for the generation of the 3D video in the MEC server. In some embodiments, after one more pixel-coding, the resulted second data volume may be less than the first data volume before the one more pixel-coding. In this way, the data volume of the transmitted 3D video data may be reduced. Thus, the bandwidth taken by the data volume and the transmission delay brought by the large volume of data may be reduced. Therefore, these embodiments have the characters that the volume of data transmitted may be small, the bandwidth taken may be small and the transmission delay may also be small. Thus, the time delay of the data received by the MEC server may be small, and the MEC server could quickly and precisely restore the 3D video data and construct the 3D video.

At block 201, there are two ways to dynamically determine the current coding-mapping relationship: dynamic selection and dynamic generation.

The dynamic selection of the current coding-mapping relationship may include at least one of the following operations: the current coding-mapping relationship may be selected from candidate coding-mapping relationships according to target scenario corresponding to the 3D video data; and the current coding-mapping relationship may be selected from the candidate coding-mapping relationships according to the precision required by the 3D video data.

The target scenario may be divided into a static scenario and/or a moving scenario according to a movement state of the acquisition object. For example, if the displacement of the acquisition object in a unit time is not greater than a specific displacement, then the acquisition object may be considered to be static, otherwise the acquisition object may be considered to be moving.

If the acquisition object moves quickly, in the acquisition image, positional relationships of image parts of different parts of the acquisition object may be changing, thus pixel combinations of image parts of different parts may associate with each other. In this case, a combined coding-mapping mode may not be applicable, the single coding-mapping mode may be more suitable. Therefore, the current coding-mapping relationship selected at this time point may also be different.

The acquisition scenario may be the environment in which the acquisition object is located. In the acquired 3D video data, the acquisition scenario may be embodied as the background. The acquisition scenario may also affect the imaging of the acquisition object in the 3D video data. For example, the light color and/or the light angle in the acquisition scenario may affect the color and/or depth value of the image of the acquisition object in the 3D video data.

Therefore, in some embodiments, an appropriate coding-mapping mode and coding-mapping relationship may also be selected according to the switching rate of the acquisition scenarios.

The switching rate of the acquisition scenario may include: the switching rate determined by comparing a difference degree of the background in the images of different 3D video data. The greater the difference is, the greater the switching rate is.

For another example, the operation of selecting the current coding-mapping relationship from the candidate coding-mapping relationships according to the precision required by the 3D video data may include at least one of the following operations.

If the precision required by the 3D video data is no less than a first precision threshold, then the coding-mapping relationship in the single coding-mapping mode or a single coding-mapping relationship may be selected from the candidate coding-mapping relationships.

If the precision required by the 3D video data is less than the first precision threshold, then the coding-mapping relationship in the combined coding-mapping mode may be selected from the candidate coding-mapping relationships.

If the precision required by the 3D video data is less than a second precision threshold, then the coding-mapping relationship in the combined coding-mapping mode in which N1*M1 pixels are combined into a set may be selected from the candidate coding-mapping relationships.

If the precision required by the 3D video data is no less than the second precision threshold and less than the first precision threshold, then the coding-mapping relationship in the combined coding-mapping mode in which N2*M2 pixels are combined into a set may be selected from the candidate coding-mapping relationships. In some embodiments, N2*M2 may be less than N1*M1.

If the single coding-mapping relationship is adopted, then each pixel value should be checked. The pixel-coded data may be obtained based on each pixel value. If the combined coding-mapping mode is adopted, then a bit-data error occurring during the transmission process may cause pixel values of multiple pixels to change, thereby causing display abnormalities. Therefore, in order to ensure a high transmission precision, in some embodiments, if the required precision is greater than or equal to the first precision threshold, then the coding-mapping relationship in the single coding-mapping mode may be selected. Otherwise, for the requirement of simplifying the transmission, the combined coding-mapping mode may be adopted, and the coding-mapping relationship corresponding to the combined coding-mapping mode may be selected.

In some embodiments, the second precision threshold may be less than the first precision threshold. If the required precision is less than the second precision threshold, then the pixel-coding may be performed in a combined coding-mapping mode with more pixels in a set. Otherwise, if the required precision is no less than the second precision threshold and less than the first precision threshold, then the pixel-coding may be performed in a combined coding-mapping mode with less pixels in a set. In this way, after the coding-mapping mode has been determined, the corresponding coding-mapping relationship may be selected according to the determined coding-mapping mode.

In embodiments of the present disclosure, in the operation at block 201, an appropriate coding-mapping mode may be selected according to the target scenario and/or the transmission precision requirement, and the current coding-mapping relationship may be further selected according the selected coding-mapping mode. If there is only one coding-mapping relationship corresponding to the selected coding-mapping mode, then this coding-mapping relationship may be simply and directly selected. If there are multiple coding-mapping relationships corresponding to the selected coding-mapping mode, then one of the multiple coding-mapping relationships may be randomly selected as the current coding-mapping relationship. Or, one of the multiple coding-mapping relationships that is suitable for the current transmission may be selected further according to parameters such as the required precision and/or the target scenario.

The operation of dynamically determining the current coding-mapping relationship of pixel-coding may also include generating the current coding-mapping relationship according to the precision requirement and/or the target scenario of the 3D video data.

In some embodiments, in the operation at block 201, a currently suitable coding-mapping mode may be determined according to the current precision requirement and/or the target scenario. Then by scanning a sample 3D video data as a sample, the coding-mapping relationship corresponding to the currently suitable coding-mapping mode may be generated. The generated coding-mapping relationship is the current coding-mapping relationship dynamically determined in the operation at block 201.

The operation of generating the current coding-mapping relationship according to the precision requirement and/or the target scenario of the sample 3D video data may include the following operations: the current coding-mapping mode may be determined according to the precision requirement and/or the target scenario; if the current coding-mapping mode is a single coding-mapping mode, then serial numbers of pixel values of the 3D video data may be obtained according to a sorting acquired after the pixel values of the sample 3D video data are sorted in a preset sorting order; and a mapping relationship between the pixel value and the serial numbers of the pixel values may be established.

For example, the serial numbers of the pixel values may include at least one of the following: serial numbers of color values formed by sorting the color values; and serial numbers of depth values formed by sorting the depth values.

Taking color channels that have 8 channels as examples for illustration, a total of 256 values from '0' to '225' represent different colors. In this case, the color values may be sorted from high to low or from low to high, and serial numbers obtained after the sorting may be used as serial numbers of the color values. After that, the mapping relationship between the serial numbers of the color values and the corresponding color values may be established. The mapping relationship established may be one of the aforementioned coding-mapping relationships.

Taking the depth value as an example for illustration, the depth value may be a distance between the acquisition module of the acquired characteristic image and the acquisition object. In some embodiments, distances may be directly sorted from long to short or from short to long, and then the serial numbers obtained after the sorting may be used as the serial numbers of the depth values to construct the current coding-mapping relationship.

Therefore, in some embodiments, the operation of obtaining the serial numbers of the pixel values of the 3D video data according to the sorting in which the pixel values of the sample 3D video data are sorted in a preset sorting order may include at least one of the following: the serial numbers of the color values of the 3D video data may be obtained according to the sorting of the color values of the color pixels of the 3D video data; and the serial numbers of the depth values of the 3D video data may be obtained according to the sorting of the depth values of the depth pixels of the 3D video data.

In some other embodiments, the operation of generating the current coding-mapping relationship according to the precision requirement and/or the target scenario of the 3D video data may include the following operations: if the current coding-mapping mode is the combined coding-mapping mode, then the value of N*M in the combined coding-mapping mode may be determined according to the precision requirement and/or the target scenario; in some embodiments, the values of N and M are positive integers; based on the pixel values of the sample 3D video data, pixel sets each including pixel values of N*M pixels may be sorted, to obtain serial numbers of the pixel sets of the 3D video data; and a mapping relationship between the pixel values and the serial numbers of the pixel sets may be established.

In some embodiments, the N*M may be determined according to the precision requirement. N may be the number of rows corresponding to a pixel set, and M may be the number of columns corresponding to the pixel set. Or, N may be the number of columns corresponding to a pixel set, and M may be the number of rows corresponding to the pixel set.

In some embodiments, the serial numbers of the pixel sets may include at least one of the following: serial numbers of color value sets formed by sorting the color value sets; and serial numbers of depth value sets formed by sorting the depth value sets.

Therefore, in some embodiments, the operation of sorting the pixel sets each including pixel values of N*M pixels based on the pixel values of the sample 3D video data to obtain serial numbers of the pixel sets of the 3D video data may include: based on the color values of the color pixels of the sample 3D video data, color value sets each including color values of N*M pixels may be sorted, to obtain the serial numbers of the color value sets of the 3D video data. For example, when being sorted, the scanned color value sets may be sorted based on the time sequence in which the color value sets are scanned or based on the frequency of occurrence of the color value sets, to obtain the serial numbers of the color value sets.

In some other embodiments, the operation of sorting the pixel sets each including pixel values of N*M pixels based on the pixel values of the sample 3D video data to obtain serial numbers of the pixel sets of the 3D video data may further include: based on the depth values of the depth pixels of the sample 3D video data, depth pixel sets each including depth values of N*M pixels may be sorted, to obtain serial numbers of the depth value sets of the 3D video data.

For example, when being sorted, the depth value sets may be sorted based on average depth values of the depth value sets or based on maximum depth values or minimum depth values of the depth value sets. In short, there are many ways of sorting, and the ways of sorting are not limited to any of the above.

In some other embodiments, the operation at block 201 may directly include: an appropriate coding-mapping mode and/or coding-mapping relationship may be directly determined according to the data characteristics of the sample 3D video data.

For example, by scanning the sample 3D video data, multiple color value sets may be found to occur frequently and repeatedly in a frame of the sample 3D video data. At this time, the combined coding-mapping mode may be appropriate. N*M may be determined directly based on the color value sets, and a sorting may be conducted to obtain the serial numbers of the color value sets.

For another example, by scanning the sample 3D video data, multiple depth value sets or depth value sets with constant depth difference may be found to appear frequently and repeatedly in a frame of the 3D video data. At this time, the combined coding-mapping mode may be appropriate. N*M may be determined directly based on the depth value sets, and a sorting may be conducted to obtain the serial numbers of the depth value sets.

In some embodiments of the present disclosure, the sample 3D video data may be the 3D video data acquired before the 3D video data are formally transmitted.

In some other embodiments, if in the operation at block 201, the current coding-mapping relationship is dynamically selected, then some of the color values or depth values of the currently acquired 3D video data may not be within the current coding-mapping relationship. At this time, the method may also include: if the sample 3D video data includes pixel values that are not within the current coding-mapping relationship, then the current coding-mapping relationship may be updated according to the sample 3D video data; and the updated current coding-mapping relationship or an updated part of the current coding-mapping relationship may be sent to the MEC server.

In this way, on the one hand, compared to completely regenerating the current coding-mapping relationship, the resources and time consumed may be reduced. On the other hand, the current coding-mapping relationship that are more suitable for the current 3D video data may be obtained through partial update. In some embodiments, the operation at block 203 may include: a color coding may be performed based on the color values of the 3D video data to obtain the color-coded data; and/or, a depth-value coding may be performed based on the depth values of the 3D video data, to obtain the depth-value coded data.

In some embodiments, when the pixel coding is performed on the pixel values, only the color values of the color pixels of the 3D video data may be color coded, to obtain the color-coded data.

In some other embodiments, when the pixel coding is performed on the pixel values, only the depth values of pixel values of the 3D video data may be depth-value coded, to obtain the coded data of the depth values that are coded again.

Whether it is the color coding or a depth-value coding, after a further coding, the volume of the data transmitted to the MEC server may be reduced.

In some other embodiments, in the operation at block 203, the pixel coding may include a color coding and a depth-value coding that are performed at the same time.

The operation at block 203 may further include: the pixel values of the 3D video data and the pixel values of the current coding-mapping relationship may be matched; and the pixel-coded data may be determined based on the matching result. For example, a pixel value A1 in one or more 3D video data may be matched with all pixel values in the current coding-mapping relationship. If the pixel value A1 is successfully matched, then the pixel-coded data in the current coding-mapping relationship that correspond to the pixel value A1 may be used as the pixel-coding result of the pixel value A1.

There are three kinds of matching results: the matching result indicates that the matching is successful, herein the matching is successful may include the matching result indicates that an identical condition or a similar condition is met; and the matching result indicates that the matching is unsuccessful, that is, the matching result does not meet an identical condition and/or a similar condition.

If the identical condition is met, then it may indicate that, the pixel values of the currently acquired 3D video data may be within the current coding-mapping relationship.

If the similar condition is met, then it may indicate that, the pixel values of the currently acquired 3D video data may also be within the current coding-mapping relationship.

In some embodiments, whether a successful matching needs to meet the identical condition or the similar condition may be determined based on the current requirement.

In some embodiments, if a similarity between the pixel values of N*M pixels of currently acquired 3D video data and the pixel values of certain preset N*M pixels in the current coding-mapping relationship is scanned to be greater than a preset similarity threshold, such as 70%, 80%, 90% or 85%, then it may be considered that the pixel-coded data of the currently scanned N*M pixels and N*M pixels in the current coding-mapping relationship meet the similar condition. The pixel-coded data of N*M pixels in the current coding-mapping relationship may be directly used as the pixel-coded data of the pixel values of the currently scanned N*M pixels.

In some other embodiments, if the similarity between the pixel values of N*M pixels of the currently acquired 3D video data and the pixel values of certain preset N*M pixels in the current coding-mapping relationship is scanned to be greater than a preset similarity threshold: 70%, 80%, 90% or 85%, pixel value(s) of one or more pixel(s) of the scanned N*M pixels whose pixel value(s) is/are different from the pixel values of the N*M pixels in the current coding-mapping relationship may be further extracted or obtained. Pixel value differences between the extracted pixel values and the pixel values of the N*M pixels in the current coding-mapping relationship may be obtained by such as computing. If the pixel value differences among the extracted pixel values and the pixel values of the N*M pixels in the current coding-mapping relationship are in the preset difference range, then the pixel-coded data of the currently scanned N*M pixels and the N*M pixels in the current coding-mapping relationship may be considered to meet the similar condition of the pixel coding. Then the pixel-coded data of the N*M pixels in the current coding-mapping relationship may be directly used as the pixel-coded data of the pixel values of the currently scanned N*M pixels. Otherwise, the pixel-coded data of the scanned N*M pixels and the N*M pixels in the current coding-mapping relationship may be considered to fail to meet the similar condition of the pixel coding. For example, the pixel value differences being in the preset difference range may include: the pixel value differences indicate that two pixel values are approximate values, such as color approximate values. If the pixel value differences indicate that two colors are inverse colors, then the pixel value differences may be considered to be out of the preset difference range. If depth value difference of two depth pixels indicates that the difference of two depth values is above a preset depth value or a preset depth ratio, then the pixel value difference may be considered to be out of the preset difference range, otherwise the pixel value difference may be considered to be within the preset difference range.

In some other embodiments, if the current coding-mapping relationship is a coding-mapping function, then the coding-mapping function may automatically output the pixel-coded data upon inputting the pixel values into the coding-mapping function. For example, the coding-mapping function may be determined by fitting the color values in a sample image. In this way, when each pixel value or a set of pixel values has/have been input into the coding-mapping function, the pixel-coded data may be automatically obtained. In this way, the pixel-coded data may not need to be determined by way of matching.

In summary, in operation at block 203, there are multiple ways to determine the pixel-coded data. A specific implementation may not be limited to any specific way.

In some embodiments, the operation at block 203 may include: the current coding-mapping relationship may be queried according to the pixel values of the 3D video data, to determine the pixel-coded data.

In some embodiments, both the terminal and the MEC server could know the multiple coding-mapping relationship in advance. For example, the pixel coding-mapping table may be pre-stored in both the MEC server and the terminal. The current coding-mapping relationship may be selected from the pre-stored multiple coding-mapping relationships.

In some embodiments, the multiple coding-mapping relationships may be negotiated in advance between the terminal and the MEC server.

The multiple coding-mapping relationships may include at least one of: the pixel coding-mapping table; multiple discrete pixel coding-mapping value pairs; and function expressions of the pixel values and the pixel-coded data.

In short, there may be at least multiple kinds of expression ways of the multiple coding-mapping relationships, and the expression ways of the multiple coding-mapping relationships may not be limited to any of the above-mentioned ways.

In some embodiments, the method may further include selecting the pixel coding mode according to preset information. The preset information may include at least one of network transmission status information, load status information of the terminal and load status information of the MEC server.

The operation at block 203 may include: pixel coding the pixel values according to the selected pixel coding mode to obtain the pixel-coded data.

For example, if the network transmission status information indicates that, a current available bandwidth is greater than the bandwidth required by directly transmitting the pixel values, then the pixel coding may be unnecessary.

For another example, if the network transmission status information indicates that: current available bandwidth is less than the bandwidth required by directly transmitting the pixel values, then a pixel coding mode in which the data volume after the pixel coding is less than or equal to the current available bandwidth may be selected according to the current available bandwidth.

For another example, if different pixel coding modes are adopted, then the computation burden required for the terminal to code and the computation burden required for the MEC server to decode both vary.

In some embodiments, a suitable pixel coding mode may be selected based on the load status information of the terminal and/or the load status information of the MEC server.

The load status information may include at least one of: a current load rate, a current load amount, a maximum load rate and a maximum loan amount.

If the current load rate is high or the current load amount is great, then a pixel coding mode with a low computation burden of coding or decoding may be preferred. Otherwise, the pixel coding mode may be selected arbitrarily or based on other reference factors such as the network transmission status information.

In some embodiments, the operation of pixel coding the pixel values according to the selected pixel coding mode to obtain the pixel-coded data may include at least one of: performing a single pixel coding on the pixel values of pixels of the 3D video data according to the single pixel coding mode to obtain coded data of the first class, and the number of bits occupied by the coded data of the first class being less than the number of bits occupied by the pixel values; and performing a combined pixel coding on the pixel values of N*M pixels of the 3D video data according to the combined pixel coding mode to obtain coded data of the second class. In some embodiments, the values of N and M are both positive integers.

In some embodiments, it is possible to perform the single pixel coding, one pixel value may correspond to one pixel-coded datum. For example, the image of 3D video data may include S pixels, and after a single pixel coding, S coded data of the first class may be obtained. In order to reduce the data volume, the number of bits occupied by one coded datum of the first class may be less than the number of bits occupied by the pixel value itself. For example, one pixel value may occupy 32 bits or 16 bits. While one coded datum of the first class may only occupy 8 bits or 10 bits. In this way, since the number of bits required for the transmission of each single pixel is reduced, then the data volume required as a whole may be reduced.

In some embodiments, the combined pixel coding may also be performed.

The combined pixel coding may mean that multiple pixels may be pixel coded simultaneously.

For example, adjacent pixels in a pixel matrix may be coded simultaneously. Or, a plurality of pixels arranged in a matrix or arranged in a non-matrix manner may be pixel coded simultaneously.

In some embodiments, a pixel matrix composed of 3*3 or 4*4 pixels may be coded. In some embodiments, N*M could be exactly divided by the number of pixels included in one frame of the 3D video data.

In some cases, when an image acquisition is performed, the depth values and/or the color information of these adjacent pixels may be relatively fixed. These color values or depth values may be combined into color value sets or depth value sets, thus preset code values may be generated in the current coding-mapping relationship. In this way, when the pixel coding is performed later, the color values or the depth values in a corresponding 3D video frame may be scanned, to determine if certain color value sets and/or depth value sets may be included. The color value sets and/or depth value sets may then be converted to corresponding code values, to obtain the pixel-coded data.

In some embodiments, the single pixel coding and the combined pixel coding may be used in combination according to the current requirement.

At the time the pixel-coded data are transmitted or before the pixel-coded data are transmitted, the selected pixel coding mode may be noticed or informed in advance. The selected pixel coding mode may be the afore-mentioned single pixel coding, combined pixel coding, or a hybrid pixel coding that mixes or hybridizes the single pixel coding and the combined pixel coding.

The N*M pixels may be distributed adjacently.

The N*M pixels may be distributed at intervals in a preset interval manner.

If the N*M pixels are distributed adjacently, then a matrix composed of N*M pixels may be formed.

The N*M pixels may be distributed at intervals in a preset interval manner. For example, two pixels belonging to the N*M pixels may be separated by a preset number of pixels, for example, by one or more pixels.

In some embodiments, the N*M may be determined dynamically, or may be set statically.

For example, an image in a frame of the 3D video data may be divided into a first region and a second region. The first region may adopt the single pixel coding. The second region may adopt the combined pixel coding.

For another example, in the image of the frame of the 3D video data, pixel values of the first region may be directly transmitted to the MEC server, the second region may be single pixel coded and/or combined pixel coded.

In this way, the relationship between the volume of data transmitted and the image quality may be well balanced.

In some embodiments, the operation of querying the current coding-mapping relationship according to the pixel values of the 3D video data to determine the pixel-coded data may include: querying the current coding-mapping relationship according to pixel values of the 3D video data; and determining the pixel-coded data according to pixel-coded values in the current coding-mapping relationship corresponding to the pixel values in response to the pixel values being within the current coding-mapping relationship.

The multiple coding-mapping relationships of the image data of one frame of the 3D video data may have been determined in advance, but in other cases may be undetermined, or may have changed over time.

For example, taking a 3D live video of a host as an example, if the host has participated in a 3D live video before, then the coding-mapping relationships of a face of the host may be stored in the terminal held by the host or in the MEC server. If the face of the host is suddenly modified or the makeup of the face alters, then at least the color image of the face may have changed. At this time, the above-mentioned current coding-mapping relationship may not be in the prestored multiple coding-mapping relationship.

In some other embodiments, the method may further include: if the pixel value is not in the current coding-mapping relationship, the current coding-mapping relationship may be updated according to the pixel value. Then the updated current coding-mapping relationship or an updated part of the current coding-mapping relationship may be sent to the MEC server.

In some embodiments, in order to facilitate the determination of the current coding-mapping relationship, one or more 3D video data of the target object may be acquired during an interactive handshake phase or a debugging phase before an official live broadcast. Through scanning pixel values of these 3D video data, it is determined whether the current coding-mapping relationship corresponding to the target object has been established, or whether the current coding-mapping relationship needs to be updated. If the 3D coding-mapping relationship needs to be updated, then the 3D coding-mapping relationship may be updated. Otherwise, an official interaction of the 3D video data may directly begin.

In some embodiments, the operation at block 203 may include: the serial numbers of the pixel values of the 3D video data may be obtained according to the sorting of the pixel values of the 3D video data which are sorted in a preset sorting order.

For example, taking a human face as an example, a skin color and an elevation of the face may both have their maximum values and minimum values. Thus, two-dimensional images and/or depth images acquired by the image acquisition module may be concentrated in a specific range of the color value or a specific range of the depth value. In most cases, they will not reach the maximum pixel value and the minimum pixel value of the image acquisition device. Although a color channel of 16 bits corresponds to 512 possible pixel values, but only about 200 or even 100 pixel values could be effectively used.

By sorting the pixel values, it is possible to know how many pixel values are currently generated. For example, if P pixel values are generated, then bits of a round-up integer of log 2P are needed to complete the pixel coding of all pixels, and the pixel-coded data that only occupy bits of the round-up integer of log 2P may be obtained. In this way, the data volume required could be greatly reduced.

If a target object (for example, various types of hosts, specific types of scenarios) often appears in the video, then by sorting the above statistical numbers of the pixel values, the current coding-mapping relationship may be generated, or the current coding-mapping relationship may be updated, and thus the determination and generation of the current coding-mapping relationship may be completed.

If the pixel values are sorted according to statistic numbers, then a serial number of a pixel value corresponding to a pixel value with a high frequency of occurrence will appear first. In this way, when the coding of the 3D video data in a same target scenario and with a same acquisition object as the sample 3D video data is subsequently used, the number of the matching of the pixel value may be reduced, and the efficiency of pixel coding may be improved.

In some embodiments, since the current coding-mapping relationship obtained for different target objects may be different, the data may have the characteristic of a higher security without revealing the current coding-mapping relationship. In this way, if another person intercepts the pixel-coded data during the transmission process of the pixel-coded data, the 3D video data cannot be decoded normally. Thus, the pixel-coded data may have the characteristic of high transmission security.

Figure 3:
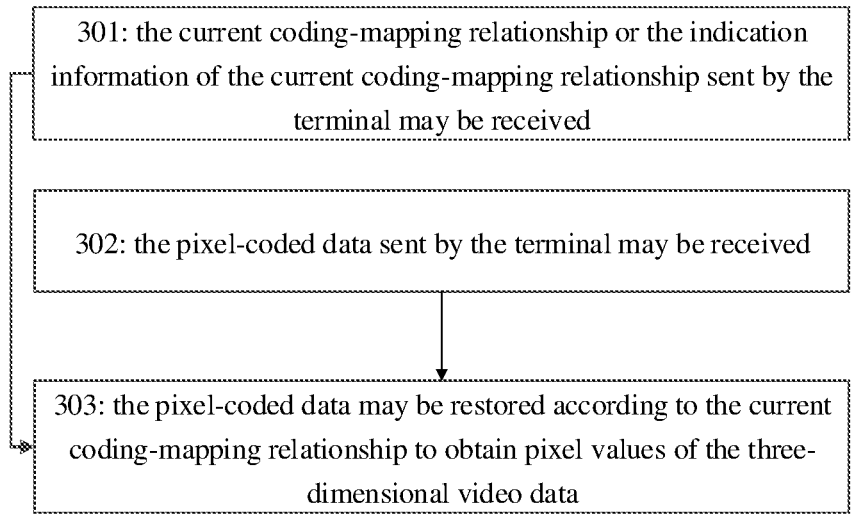
FIG. 3 is a schematic flowchart of another data processing method according to an embodiment of the present disclosure.

As shown in FIG. 3, in some embodiments of the present disclosure, a data processing method may be provided. The data processing method may be applied to a mobile edge computing MEC server. The data processing method may include the following operations.

At block 301: a current coding-mapping relationship or indication information of the current coding-mapping relationship sent by a terminal may be received.

At block 302: pixel-coded data sent by the terminal may be received.

At block 303: the pixel-coded data may be restored according to the current coding-mapping relationship to obtain pixel values of the 3D video data. The data volume of the 3D video data before being pixel coded may be the first data volume. The data volume of the 3D video data after being pixel coded may be the second data volume. The first data volume may be greater than the second data volume.

In some embodiments, what are directly received are not the pixel values but the pixel-coded data. The MEC server may receive the pixel-coded data and then restore the pixel-coded data to the pixel values of the 3D video data.

Since the current coding-mapping relationship is dynamically determined, the MEC server may also receive the current coding-mapping relationship or the indication information of the current coding-mapping relationship from the terminal, to facilitate the restoring of the pixel-coded data at the block 303 according to the current coding-mapping relationship.

Since the pixel-coded data received by the MEC server have a data volume smaller than the data volume of the pixel values directly received, thus the bandwidth taken may be smaller.

The operation at block 303 may include at least one of the following operations.

Color values of the 3D video data may be restored based on the current coding-mapping relationship and the color-coded data of the pixel-coded data.

Depth values of pixel values of the 3D video data may be restored based on the current coding-mapping relationship and the depth-value coded data of the pixel-coded data.

In some embodiments, the color values may be restored based on the color-coded data, and the depth values of pixel values may be restored based on the depth-value coded data.

The operation at block 303 may further include at least one of the following operations.

The pixel-coded data of pixels may be decoded by utilizing the current coding-mapping relationship and according to a single pixel coding mode to restore pixel values of the 3D video data.

The pixel-coded data of N*M pixels may be decoded by utilizing the current coding-mapping relationship and according to a combined pixel coding mode to restore the pixel values of the 3D video data.

In some embodiments, the method may further include: determining the pixel coding mode of the pixel-coded data.

For example, the pixel coding mode may include the single coding mode and/or the combined coding mode.

The operation at block 303 may include: pixel decoding may be performed on the pixel-coded data according to the pixel coding mode to obtain the pixel values of the 3D video data.

In some embodiments, there may be multiple ways illustrated below to determine the pixel coding mode.

Option one: the pixel number included in the 3D video data may be determined, and the data number of the pixel-coded data may be determined. The pixel coding mode may be determined according to the pixel number and the data number.

Option two: pixel-coding parameters may be interacted with the terminal. The pixel-coding parameters may at least include the pixel coding mode.

In some embodiments, the pixel-coding parameters may include the pixel coding mode. In some other embodiments, the parameters of the pixel coding may further include: values of N*M in the combined coding-mapping mode; and the number of bits occupied by one pixel-coded datum in the single coding-mapping mode and/or the combined coding-mapping mode.

In some embodiments, the operation of pixel decoding the pixel-coded data according to the pixel coding mode to obtain the pixel values of the 3D video data may include at least one of: decoding the pixel-coded data of a single pixel according to the single pixel coding mode to restore the 3D video data pixel value; and decoding the pixel-coded data of the N*M pixels according to the combined pixel coding mode to restore the 3D video data pixel values.

In some embodiments, the operation at block 303 may include: querying the current coding-mapping relationship according to the pixel-coded data, to obtain the pixel values corresponding to the pixel-coded data.

In some embodiments, the method may further include: receiving the updated current coding-mapping relationship or the updated part of the current coding-mapping relationship sent by the terminal before the pixel values of the 3D video data are restored according to the pixel-coded data.

Through the interaction of the current coding-mapping relationship, the current coding-mapping relationship may be synchronized between the terminal and the MEC server.

Figure 4:
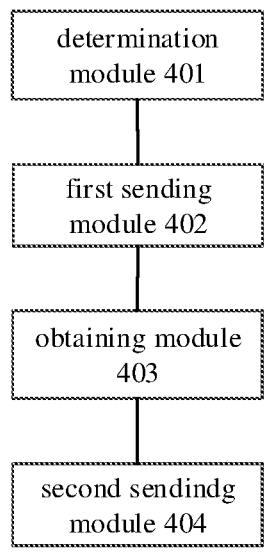
FIG. 4 is a schematic flowchart of yet another data processing method according to an embodiment of the present disclosure.

As is illustrated in FIG. 4, a data processing apparatus applied to the terminal may be provided in some embodiments. The data processing apparatus may include a determining module 401, a first sending module 402, an obtaining module 403 and a second sending module 404.

The determining module 401 may be configured to dynamically determine the current coding-mapping relationship of pixel coding.

The first sending module 402 may be configured to send the current coding-mapping relationship or indication information of the current coding-mapping relationship to the mobile edge computing MEC server.

The obtaining module 403 may be configured to perform pixel coding on pixel values of the 3D video data based on the current coding-mapping relationship to obtain the pixel-coded data.

The second sending module 404 may be configured to send the pixel-coded data to the mobile edge computing MEC server. The pixel-coded data may be configured to restore the 3D video data by the MEC server.

The data volume of the 3D video data before being pixel-coded may be the first data volume. The data volume of the 3D video data after being pixel-coded may be the second data volume. The first data volume may be greater than the second data volume.

In some embodiments, the first sending module 402, the obtaining module 403 and the second sending module 404 may be program modules corresponding to computer executable instructions. After the computer executable instructions are executed, the afore-mentioned pixel-coded data and 3D video data could be sent.

In some other embodiments, the first sending module 402, the obtaining module 403 and the second sending module 404 may each also be a combination of a hardware module and a program module, such as a complex programmable array or a field programmable array.

In some other embodiments, the first sending module 402, the obtaining module 403 and the second sending module 404 may correspond to hardware modules. For example, the first sending module 402, the obtaining module 403 and the second sending module 404 may be application-specific integrated circuits.

In some embodiments, the determining module 401 may include a first selecting sub-module and a second selecting sub-module.

The first selecting sub-module may be configured to select the current coding-mapping relationship from candidate coding-mapping relationships according to the target scenario corresponding to the 3D video data.

The second selecting sub-module may be configured to select the current coding-mapping relationship from candidate coding-mapping relationships according to the precision requirement of the 3D video data.

In some embodiments, the first selecting sub-module may be further configured to perform at least one of: selecting the coding-mapping relationship in a single coding-mapping mode as the current coding-mapping relationship in response to the 3D video data corresponding to a moving scenario in which an acquisition object moves; selecting the coding-mapping relationship in a combined coding-mapping mode as the current coding-mapping relationship in response to the 3D video data corresponding to a static scenario in which the acquisition object is static; selecting the coding-mapping relationship in single coding-mapping mode as the current coding-mapping relationship in response to a switching rate of the acquisition scenario corresponding to the 3D video data being greater than a first preset rate; and selecting the coding-mapping relationship in the combined coding-mapping mode as the current coding-mapping relationship in response to the switching rate of the acquisition scenario corresponding to the 3D video data being less than the first preset rate.

In some embodiments, the second selecting sub-module may be configured to perform at least one of: selecting a coding-mapping relationship in the single coding-mapping mode from the candidate coding-mapping relationships in response to the precision requirement of the 3D video data being no less than a first precision threshold; selecting a coding-mapping relationship in the combined coding-mapping mode from the candidate coding-mapping relationships in response to the precision requirement of the 3D video data being less than the first precision threshold; selecting a coding-mapping relationship in the combined coding-mapping mode in which N1*M1 pixels are combined into a set from the candidate coding-mapping relationships in response to the precision requirement of the 3D video data being less than the second precision threshold; and selecting the coding-mapping relationship in the combined coding-mapping mode in which N2*M2 pixels are combined into a set from candidate coding-mapping relationships in response to the precision requirement of the 3D video data being no less than the second precision threshold and less than the first precision threshold. The second precision threshold is less than the first precision threshold. N2*M2 may be less than N1*M1.

In some embodiments, the determining module 401 may include a generating sub-module.

The generating sub-module may be configured to generate the current coding-mapping relationship according to the precision requirement and/or the target scenario of the 3D video data.

In some embodiments, the generating sub-module may be configured to: determine a current coding-mapping mode according to the precision requirement and/or the target scenario; obtain serial numbers of pixel values of the 3D video data according to a sorting of the pixel values of the sample 3D video data which are sorted in a preset sorting order in response to the current coding-mapping mode being the single coding-mapping mode; and establish a mapping relationship between the pixel values and the serial numbers of pixel values.

In some embodiments, the serial numbers of pixel values may include at least one of: serial numbers of color values formed by sorting the color values; and serial numbers of the depth values formed by sorting the depth values.

In some embodiments, the generating sub-module may be configured to: determine a value of N*M in the combined coding-mapping mode according to the precision requirement and/or the target scenario in response to the current coding-mapping mode being the combined coding-mapping mode, and the values of N and M being positive integers; sort pixel sets each including pixel values of N*M pixels according to the pixel values of the sample 3D video data, to obtain serial numbers of the pixel sets of the sample 3D video data; and establish a mapping relationship between the pixel values and the serial numbers of the pixel sets.

In some embodiments, the serial numbers of the pixel sets may include at least one of the following: serial numbers of the color value sets formed by sorting the color value sets; and serial numbers of depth value sets formed by sorting the depth value sets.

In some embodiments, the apparatus may further include an updating module and a third sending module.

The updating module may be configured to update the current coding-mapping relationship according to the sample 3D video data, in response to the sample 3D video data including the pixel values being out of or not within the current coding-mapping relationship.

The third sending module may be configured to send the updated current coding-mapping relationship or an updated part of the current coding-mapping relationship to the MEC server.

In some embodiments, the obtaining module 403 may be configured to perform at least one of: performing a single pixel coding on pixel values of pixels of the 3D video data according to the current coding-mapping relationship in the single pixel coding mode to obtain an coded data of the first class, and the number of bits occupied by coded data of the first class being less than the number of bits occupied by the pixel values; perform a combined pixel coding on the pixel values of N*M pixels of the 3D video data according to the current coding-mapping relationship in the combined pixel coding mode to obtain a coded data of the second class. The values of N and M may be both positive integers.

Figure 5:
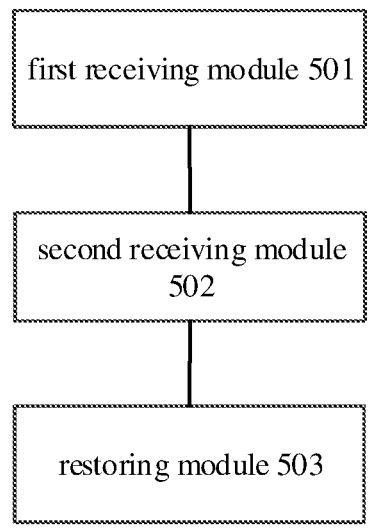
FIG. 5 is a schematic structural diagram of a data processing apparatus according to an embodiment of the present disclosure.

As is shown in FIG. 5, a data processing apparatus applied to a mobile edge computing MEC server is provided in some embodiments. The data processing apparatus may include a first receiving module 501, a second receiving module 502 and a restoring module 503.

The first receiving module 501 may be configured to receive the current coding-mapping relationship or indication information of the current coding-mapping relationship sent by a terminal.

The second receiving module 502 may be configured to receive pixel-coded data sent by the terminal.

The restoring module 503 may be configured to obtain pixel values of the 3D video data by restoring the pixel-coded data according to the current coding-mapping relationship. The data volume of the 3D video data before being pixel-coded may be the first data volume. The data volume of the 3D video data after being pixel-coded may be the second data volume. The first data volume may be greater than the second data volume.

In some embodiments, the first receiving module 501, the second receiving module 502 and the restoring module 503 may be program modules corresponding to computer executable instructions. After the computer executable instructions are executed, the afore-mentioned pixel-coded data and 3D video data could be sent.

In some other embodiments, the first receiving module 501, the second receiving module 502 and the restoring module 503 may each also be a combination of a hardware module and a program module, such as complex programmable array or field programmable array.

In some other embodiments, the first receiving module 501, the second receiving module 502 and the restoring module 503 may correspond to hardware modules. For example, the first receiving module 501, the second receiving module 502 and the restoring module 503 may be application-specific integrated circuits.

In some embodiments, the restoring module 503 may be configured to perform at least one of: restoring color values of the 3D video data according to the current coding-mapping relationship and color-coded data of the pixel-coded data; and restoring depth values of pixel values of the 3D video data according to the current coding-mapping relationship and depth-value coded data of the pixel-coded data.

In some other embodiments, the restoring module 503 may be configured to perform at least one of: restoring pixel values of the 3D video data by decoding pixel-coded data of pixels by utilizing the current coding-mapping relationship and according to a single pixel coding mode; restoring pixel values of the 3D video data by decoding pixel-coded data of N*M pixels by utilizing the current coding-mapping relationship and according to a combined pixel coding mode.

A non-transitory computer storage medium may be provided in some embodiments. At least one computer instruction may be stored in the non-transitory computer storage medium. When the at least one instruction is executed by the processor, operations of the data processing method (such as one or more of the methods shown in FIG. 2 and FIG. 3) applied to the terminal or the MEC server may be implemented.

Figure 6:
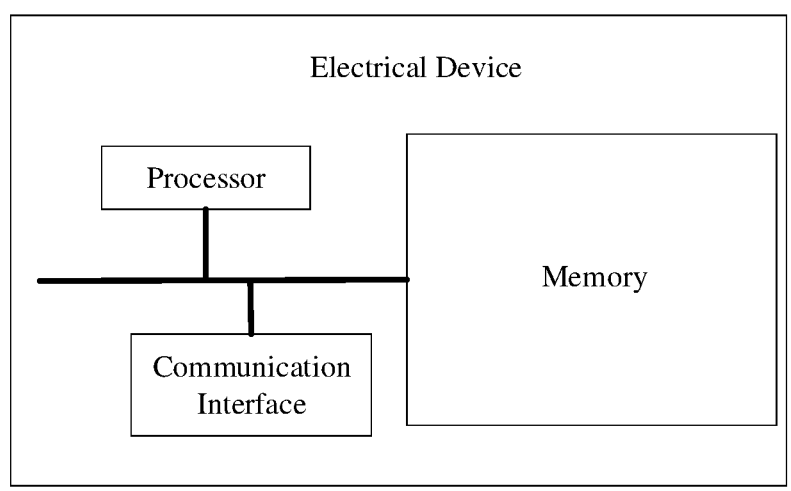
FIG. 6 is a schematic structural diagram of another data processing apparatus according to an embodiment of the present disclosure.

As is shown in FIG. 6, an electronic device may be provided in some embodiments. The electronic device may include a memory, a processor, and at least one computer instruction. The at least one computer instruction may be stored in the memory and may be implemented in the processor. The processor may implement the at least one computer instruction to implement operations of the data processing methods applied to the terminal or the MEC server, such as to implement one or more of the methods shown in FIG. 2 and FIG. 3.

In some embodiments, the electronic device may further include a communication interface. The communication interface may be configured to exchange information with other devices. For example, if the electronic device is a terminal, then the communication interface may exchange information at least with the MEC server. If the electronic device is an MEC server, then the communication interface may exchange information at least with the terminal.

A specific example may be provided in connection with any of the above-mentioned embodiments as follows.

A mapping table may be dynamically selected according to actual situations of the current target scenario and the precision requirement. RGB of each pixel of an image may be scanned after the RGB is acquired by a cell phone. If the RGB is in a color sequence, then RGB data may be replaced by a serial number of the color. Specifically, RGB corresponding to all pixels of the entire image may be obtained. Then the RGB corresponding to each pixel may be replaced by a serial number according to a numbering process implemented on the colors in advance. Then the pixels and corresponding serial numbers of colors are packed and uploaded.

Common colors are numbered sequentially. After the cell phone acquires the red, green and blue (RGB) data, the RGB data of each pixel of the image may be scanned. If RGB data are in the color sequence, then the RGB data may be replaced by corresponding serial numbers of the colors. Specifically, RGB data of each pixel in the image may be scanned, and all RGB data of the entire image may be counted. Then the RGB may be sorted and numbered. The RGB of each pixel may be replaced by a serial number. Then the pixels and the counted RGB data may be packed and uploaded. A mapping table may be stored in the MEC server and the cell phone side. When transmission of the RGB data occurs, the pixels may be horizontally scanned. If a pixel is not in the mapping table, then a new mapping (such as pixel RGB-flag A [16 bits] or [32 bits] or [8 bits]) may be created and saved in the mapping table, and the RGB data may be replaced by the serial number of colors of 16 bits at the same time. After the scan, changed items in the mapping table and RGB data may be uploaded. Or the coding of a single pixel may expand to N*N pixels, and the N*N pixels may be coded together.

In several embodiments provided in the present disclosure, it should be understood that, the disclosed methods and smart devices may be implemented in other ways. The device embodiments described above are merely illustrative. For example, the division of units is only a logical function division, and there may be other division manners in actual implementations. For example, multiple units or components may be combined or integrated into another system, or some features may be ignored or not implemented. In addition, the couplings, direct couplings or communication connections between the components shown or discussed may be indirect couplings or communication connections through some interfaces, devices or units, and may be electrical, mechanical or of other forms.

The units described above as separate components may or may not be physically separate. The component displayed as a unit may or may not be a physical unit. That is, this component may be located in one place or distributed in multiple network units. Some or all of the units may be selected according to actual requirements to achieve the object of the solution of the present embodiment.

In addition, the functional units in the embodiments of the present disclosure may all be integrated into a second processing unit, or each unit may be individually used as a single unit, or two or more units may be integrated into one unit. The above-mentioned integrated units may be realized in the form of hardware, or in the form of hardware in combination with software functional units.

Those of ordinary skills in the art can understand that, all or a part of the operations of the above method embodiments may be implemented by a hardware relating to a program instruction. The above-mentioned program may be stored in a computer readable storage medium. When the program is executed, the operations of the above-mentioned method embodiments may be executed. The afore-mentioned storage medium may include various mediums that could store program instructions such as a removable storage device, a ROM (read only memory), a RAM (random access memory), a magnetic disk, an optical disk, or the like.

Alternatively, in some embodiments of the present disclosure, if the above-mentioned integrated unit is implemented in the form of a software function module and sold or used as an independent product, the unit may also be stored in a computer readable storage medium. With this in mind, the technical solutions of the embodiments of the present disclosure in essence or its parts that contribute to the art may be embodied in the form of a software product. The computer software product may be stored in a storage medium and include several instructions to make a computer device (which may be a personal computer, an MEC server, or a network device etc.) to execute all or parts of the methods described in various embodiments of the present disclosure. The afore-mentioned storage medium may include mediums that could store program instructions, such as a removable storage device, a ROM, a RAM, a magnetic disk, an optical disk, or the like.

It should be noted that, the technical solutions described in embodiments of the present disclosure may be combined arbitrarily without causing confliction.

The above are only specific implementations of the present disclosure, and the protection scope of the present disclosure is not limited thereto. Changes or alternations within the technical scope of the present disclosure could easily occur to those skilled in the art and should be considered to be in the protection scope of the present disclosure.

What is claimed is:

1. A method of data processing applied to a terminal, comprising:
   dynamically determining a current coding-mapping relationship of pixel coding;
   sending the current coding-mapping relationship or indication information of the current coding-mapping relationship to a mobile edge computing MEC server;
   performing pixel coding on pixel values of three-dimensional video data based on the current coding-mapping relationship and obtaining pixel-coded data; and
   sending the pixel-coded data to the mobile edge computing MEC server, wherein the pixel-coded data are configured to restore the three-dimensional video data by the MEC server;
   wherein a data volume of the three-dimensional video data before pixel coding is a first data volume, a data volume of the three-dimensional video data after pixel coding is a second data volume, and the first data volume is greater than the second data volume; and wherein dynamically determining the current coding-mapping relationship of pixel coding comprises at least one of:
  selecting the current coding-mapping relationship from candidate coding-mapping relationships in response to a target scenario corresponding to the three-dimensional video data; or
  selecting the current coding-mapping relationship from the candidate coding-mapping relationships in response to a precision requirement of the three-dimensional video data.

2. The method as claimed in claim 1, wherein selecting the current coding-mapping relationship from candidate coding-mapping relationships in response to the target scenario corresponding to the three-dimensional video data comprises at least one of:
  selecting a first coding-mapping relationship in a single coding-mapping mode as the current coding-mapping relationship in response to the three-dimensional video data corresponding to a moving scenario in which an acquisition object moves;
  selecting a second coding-mapping relationship in a combined coding-mapping mode as the current coding-mapping relationship in response to the three-dimensional video data corresponding to a static scenario in which the acquisition object is static;
  selecting the first coding-mapping relationship in the single coding-mapping mode as the current coding-mapping relationship in response to a switching rate of an acquisition scenario corresponding to the three-dimensional video data being greater than a first preset rate; or
  selecting the second coding-mapping relationship in the combined coding-mapping mode as the current coding-mapping relationship in response to the switching rate of the acquisition scenario corresponding to the three-dimensional video data being less than the first preset rate.

3. The method as claimed in claim 1, wherein selecting the current coding-mapping relationship from the candidate coding-mapping relationships in response to the precision requirement of the three-dimensional video data comprises at least one of:
  selecting a first coding-mapping relationship in a single coding-mapping mode from the candidate coding-mapping relationships in response to the precision requirement of the three-dimensional video data being no less than a first precision threshold,
  selecting a second coding-mapping relationship in a combined coding-mapping mode from the candidate coding-mapping relationships in response to the precision requirement of the three-dimensional video data being less than the first precision threshold,
  selecting a first combined coding-mapping relationship in the combined coding-mapping mode in which $N1*M1$ pixels are combined into a set from the candidate coding-mapping relationships in response to the precision requirement of the three-dimensional video data being less than a second precision threshold; or
  selecting a second combined coding-mapping relationship in the combined coding-mapping mode in which $N2*M2$ pixels are combined into a set from the candidate coding-mapping relationships in response to the precision requirement of the three-dimensional video data being no less than the second precision threshold and less than the first precision threshold;

wherein $N2*M2$ is less than $N1*M1$, and the first precision threshold is less than the second precision threshold.

4. The method as claimed in claim 1, wherein dynamically determining the current coding-mapping relationship of pixel coding comprises:
  generating the current coding-mapping relationship in response to the precision requirement and/or the target scenario of the three-dimensional video data.

5. The method as claimed in claim 4, wherein the generating the current coding-mapping relationship in response to the precision requirement and/or the target scenario of the three-dimensional video data comprises:
  determining a current coding-mapping mode according to the precision requirement and/or the target scenario;
  obtaining serial numbers of pixel values of the three-dimensional video data according to a sorting of the pixel values of a sample three-dimensional video data sorted in a preset sorting order, in response to the current coding-mapping mode being a single coding-mapping mode; and
  establishing a mapping relationship between the pixel values and the serial numbers of the pixel values.

6. The method as claimed in claim 5, wherein the serial numbers of the pixel values comprise at least one of:
  serial numbers of color values formed by sorting the color values; or
  serial numbers of depth values formed by sorting the depth values.

7. The method as claimed in claim 5, wherein the generating the current coding-mapping relationship in response to the precision requirement and/or the target scenario of the three-dimensional video data comprises:
  determining a value of $N*M$ in a combined coding-mapping mode according to the precision requirement and/or the target scenario, in response to the current coding-mapping mode being the combined coding-mapping mode; wherein values of N and M are positive integers;
  sorting pixel sets each comprising pixel values of $N*M$ pixels according to the pixel values of the sample three-dimensional video data and obtaining serial numbers of the pixel sets of the sample three-dimensional video data; and
  establishing a mapping relationship between the pixel values and the serial numbers of the pixel sets.

8. The method as claimed in claim 7, wherein the serial numbers of the pixel sets comprise at least one of:
  serial numbers of color value sets formed by sorting the color value sets; or
  serial numbers of depth value sets formed by sorting the depth value sets.

9. The method as claimed in claim 1, comprising:
  updating the current coding-mapping relationship according to a sample three-dimensional video data, in response to the sample three-dimensional video data comprising pixel values being out of the current coding-mapping relationship; and
  sending the updated current coding-mapping relationship or an updated part of the current coding-mapping relationship to the MEC server.

10. The method as claimed in claim 1, wherein performing pixel coding on pixel values of three-dimensional video data based on the current coding-mapping relationship and obtaining pixel-coded data comprises at least one of:
  performing single pixel coding on the pixel values of pixels of the three-dimensional video data according to a first coding-mapping relationship in a single coding-mapping mode and obtaining coded data of a first class, wherein the number of bits occupied by the coded data of the first class is less than the number of bits occupied by the pixel values; or performing combined pixel coding on pixel values of N*M pixels of the three-dimensional video data according to a second coding-mapping relationship in a combined coding-mapping mode and obtaining coded data of a second class, wherein values of N and M are both positive integers.

11. A method of data processing applied to a mobile edge computing MEC server, comprising:

receiving a current coding-mapping relationship or indication information of the current coding-mapping relationship sent by a terminal;

receiving pixel-coded data sent by the terminal; and obtaining pixel values of three-dimensional video data by restoring the pixel-coded data according to the current coding-mapping relationship;

wherein a data volume of the three-dimensional video data before pixel coding is a first data volume, a data volume of the three-dimensional video data after pixel coding is a second data volume, and the first data volume is greater than the second data volume; and wherein obtaining pixel values of the three-dimensional video data by restoring the pixel-coded data according to the current coding-mapping relationship comprises at least one of:

restoring the pixel values of the three-dimensional video data by decoding the pixel-coded data of pixels by utilizing the current coding-mapping relationship and according to a single coding-mapping mode, or restoring the pixel values of the three-dimensional video data by decoding the pixel-coded data of N*M pixels by utilizing the current coding-mapping relationship and according to a combined coding-mapping mode.

12. The method as claimed in claim 11, wherein obtaining pixel values of the three-dimensional video data by restoring the pixel-coded data according to the current coding-mapping relationship comprises at least one of:

restoring color values of the three-dimensional video data according to color coded data of the pixel-coded data and the current coding-mapping relationship; or restoring depth values of the pixel values of the three-dimensional video data according to depth-value coded data of the pixel-coded data and the current coding-mapping relationship.

13. A non-transitory computer storage medium, the computer storage medium storing at least one computer instruction, wherein when being executed by a processor, the at least one instruction is configured to implement operations of a data processing method applied to a terminal, the data processing method comprises:

dynamically determining a current coding-mapping relationship of pixel coding;

sending the current coding-mapping relationship or indication information of the current coding-mapping relationship to a mobile edge computing MEC server;

performing pixel coding on pixel values of three-dimensional video data based on the current coding-mapping relationship and obtaining pixel-coded data; and sending the pixel-coded data to the mobile edge computing MEC server, wherein the pixel-coded data are configured to restore the three-dimensional video data by the MEC server;

wherein a data volume of the three-dimensional video data before pixel coding is a first data volume, a data volume of the three-dimensional video data after pixel coding is a second data volume, and the first data volume is greater than the second data volume; and dynamically determining a current coding-mapping relationship of pixel coding comprises at least one of:

selecting the current coding-mapping relationship from candidate coding-mapping relationships in response to a target scenario corresponding to the three-dimensional video data; or selecting the current coding-mapping relationship from the candidate coding-mapping relationships in response to a precision requirement of the three-dimensional video data.

14. The non-transitory computer storage medium as claimed in claim 13, wherein selecting the current coding-mapping relationship from candidate coding-mapping relationships in response to a target scenario corresponding to the three-dimensional video data comprises at least one of:

selecting a first coding-mapping relationship in a single coding-mapping mode as the current coding-mapping relationship in response to the three-dimensional video data corresponding to a moving scenario in which an acquisition object moves;

selecting a second coding-mapping relationship in a combined coding-mapping mode as the current coding-mapping relationship in response to the three-dimensional video data corresponding to a static scenario in which the acquisition object is static;

selecting the first coding-mapping relationship in the single coding-mapping mode as the current coding-mapping relationship in response to a switching rate of an acquisition scenario corresponding to the three-dimensional video data being greater than a first preset rate; or selecting the second coding-mapping relationship in the combined coding-mapping mode as the current coding-mapping relationship in response to the switching rate of the acquisition scenario corresponding to the three-dimensional video data being less than the first preset rate.

15. The non-transitory computer storage medium as claimed in claim 13, wherein selecting the current coding-mapping relationship from the candidate coding-mapping relationships in response to a precision requirement of the three-dimensional video data comprises at least one of:

selecting a first coding-mapping relationship in a single coding-mapping mode from the candidate coding-mapping relationships in response to the precision requirement of the three-dimensional video data being no less than a first precision threshold;

selecting a second coding-mapping relationship in a combined coding-mapping mode from the candidate coding-mapping relationships in response to the precision requirement of the three-dimensional video data being less than the first precision threshold, selecting a first combined coding-mapping relationship in the combined coding-mapping mode in which N1*M1 pixels are combined into a set from the candidate coding-mapping relationships in response to the precision requirement of the three-dimensional video data being less than a second precision threshold; or selecting a second combined coding-mapping relationship in the combined coding-mapping mode in which N2*M2 pixels are combined into a set from the candidate coding-mapping relationships in response to the precision requirement of the three-dimensional video data being no less than the second precision threshold and less than the first precision threshold;

wherein N2*M2 is less than N1*M1 and the first precision threshold is less than the second precision threshold.

16. The non-transitory computer storage medium as claimed in claim 13, wherein dynamically determining a current coding-mapping relationship of pixel coding comprises:

generating the current coding-mapping relationship in response to the precision requirement and/or the target scenario of the three-dimensional video data; and the generating the current coding-mapping relationship in response to the precision requirement and/or the target scenario of the three-dimensional video data comprises:

determining a current coding-mapping mode according to the precision requirement and/or the target scenario;

obtaining serial numbers of pixel values of the three-dimensional video data according to a sorting of the pixel values of a sample three-dimensional video data sorted in a preset sorting order, in response to the current coding-mapping mode being a single coding-mapping mode; and establishing a mapping relationship between the pixel values and the serial numbers of the pixel values.

17. The non-transitory computer storage medium as claimed in claim 13, wherein performing pixel coding on pixel values of three-dimensional video data based on the current coding-mapping relationship and obtaining pixel-coded data comprises at least one of:

performing single pixel coding on the pixel values of pixels of the three-dimensional video data according to a first coding-mapping relationship in a single coding-mapping mode and obtaining coded data of a first class, wherein the number of bits occupied by the coded data of the first class is less than the number of bits occupied by the pixel values; or performing combined pixel coding on pixel values of N*M pixels of the three-dimensional video data according to a second coding-mapping relationship in a combined coding-mapping mode and obtaining coded data of a second class, wherein values of N and M are both positive integers.

* * * * *